(12) United States Patent
Hees

(10) Patent No.: US 7,815,093 B2
(45) Date of Patent: Oct. 19, 2010

(54) GUIDING DEVICE

(75) Inventor: Stefan Willem Hees, Breda (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 77 days.

(21) Appl. No.: 12/439,830

(22) PCT Filed: Sep. 4, 2006

(86) PCT No.: PCT/NL2006/000444

§ 371 (c)(1),
(2), (4) Date: Mar. 4, 2009

(87) PCT Pub. No.: WO2008/030079

PCT Pub. Date: Mar. 13, 2008

(65) Prior Publication Data

US 2010/0176183 A1 Jul. 15, 2010

(51) Int. Cl.
*B23K 37/04* (2006.01)
*B23K 31/02* (2006.01)

(52) U.S. Cl. .................. 228/44.5; 228/49.3; 228/103; 228/119; 228/212

(58) Field of Classification Search .................. None
See application file for complete search history.

(56) References Cited

U.S. PATENT DOCUMENTS

| | | | | |
|---|---|---|---|---|
| 1,966,248 A | * | 7/1934 | Kane | 166/380 |
| 2,054,375 A | * | 9/1936 | Halle | 228/4.1 |
| 2,130,587 A | * | 9/1938 | Kane | 285/288.1 |
| 2,167,338 A | * | 7/1939 | Murcell | 166/380 |
| 2,522,459 A | * | 9/1950 | Mitchell | 269/48.1 |
| 2,538,365 A | * | 1/1951 | Jones | 29/253 |
| 2,840,687 A | * | 6/1958 | Rac, Jr. | 219/158 |
| 3,102,187 A | * | 8/1963 | Coscia | 219/60 A |
| 3,427,428 A | * | 2/1969 | Nelson et al. | 219/125.11 |
| 3,458,922 A | * | 8/1969 | Sanders et al. | 228/141.1 |
| 3,538,295 A | * | 11/1970 | Paton et al. | 219/101 |
| 3,651,959 A | * | 3/1972 | Castela et al. | 414/22.58 |
| 3,653,574 A | * | 4/1972 | Dearman | 228/49.1 |
| 3,658,231 A | * | 4/1972 | Gilman | 228/44.5 |
| 3,745,319 A | * | 7/1973 | Unigovsky et al. | 219/101 |
| 3,836,746 A | * | 9/1974 | Sakharnov et al. | 219/101 |
| 4,176,269 A | * | 11/1979 | Merrick et al. | 219/60 A |

(Continued)

FOREIGN PATENT DOCUMENTS

GB    1 299 754    12/1972

(Continued)

*Primary Examiner*—Kiley Stoner
(74) *Attorney, Agent, or Firm*—Hoffmann & Baron, LLP

(57) ABSTRACT

The present invention relates to a guiding device (40) configured to guide equipment units for joining pipe sections which are arranged in a substantially upright position. The guiding device comprises a stationary body (41), one or more movable carriers being movably supported on said stationary body and configured to revolve one or more equipment units about a pipe section, a pipeline engagement device (63) configured to engage said guiding device with said pipe section and to support said stationary body, and one or more adjustable supports (44), said one or more adjustable supports being configured to make adjustment possible of a working plane of one or more equipment units (47, 48, 49) mounted on or to be mounted on said one or more carriers with respect to a pipe section on which the guiding device is mounted.

22 Claims, 6 Drawing Sheets

U.S. PATENT DOCUMENTS

| | | | | |
|---|---|---|---|---|
| 4,180,349 | A * | 12/1979 | van Bilderbeek | 405/224 |
| 4,214,692 | A * | 7/1980 | Le Garfe et al. | 228/44.3 |
| 4,413,765 | A * | 11/1983 | Tracy | 228/119 |
| 4,483,059 | A * | 11/1984 | Dearman | 29/272 |
| 4,565,003 | A * | 1/1986 | McLeod | 29/281.1 |
| 4,693,498 | A * | 9/1987 | Baugh et al. | 285/39 |
| 4,885,450 | A * | 12/1989 | Paton et al. | 219/101 |
| 5,171,954 | A * | 12/1992 | Rinaldi | 219/61 |
| 6,000,482 | A * | 12/1999 | Michalski | 175/57 |
| 6,059,175 | A * | 5/2000 | Hamada et al. | 228/194 |
| 6,070,784 | A * | 6/2000 | Holt et al. | 228/112.1 |
| 6,078,031 | A * | 6/2000 | Bliault et al. | 219/607 |
| 6,184,493 | B1 * | 2/2001 | Tsuchiya | 219/161 |
| 6,361,251 | B1 * | 3/2002 | Soltanahmadi et al. | 405/170 |
| 6,425,709 | B1 * | 7/2002 | Frijns | 405/170 |
| 7,150,328 | B2 * | 12/2006 | Marketz et al. | 166/380 |
| 2001/0017292 | A1 * | 8/2001 | Belloni et al. | 219/125.11 |
| 2004/0009042 | A1 * | 1/2004 | Belloni et al. | 405/170 |
| 2004/0056066 | A1 | 3/2004 | Marhofer et al. | |
| 2004/0079786 | A1 * | 4/2004 | Haugen | 228/107 |
| 2004/0134970 | A1 * | 7/2004 | Den Boer et al. | 228/104 |
| 2006/0076328 | A1 * | 4/2006 | Hastings et al. | 219/125.11 |
| 2007/0108171 | A1 * | 5/2007 | Stecher et al. | 219/123 |

FOREIGN PATENT DOCUMENTS

| | | | |
|---|---|---|---|
| JP | 61-78596 A | * | 4/1986 |
| WO | 2004/071702 A1 | | 8/2004 |

\* cited by examiner

GUIDING DEVICE

CROSS-REFERENCE TO RELATED APPLICATIONS

This application is the National Stage of International Application No. PCT/NL2006/000444, filed Sep. 4, 2006, the contents of which is incorporated by reference herein.

FIELD OF THE INVENTION

The present invention relates to a guiding device and a method using such guiding device.

BACKGROUND

In the offshore industry there is a need for underwater pipelines. These underwater pipelines may be provided by joining pipe sections together in a substantially vertically position to form a pipeline which is lowered from a vessel to an underwater bottom. In such a pipe laying method, which is commonly referred to as a J-lay method, a plurality of pipe sections, welded to one another, together forming a part of the pipeline, hang down from a vessel in a substantially vertical direction, where an upper end of the most recently joined pipe section is to be welded to a lower end of a new pipe section being lined up above said upper end.

In a specific embodiment of the J-lay method, at least one end of the pipe sections is provided with a collar for easier handling of the pipe sections. Upon completion of a weld, the end of the pipeline is gripped by the collar with a head clamp and lowered to just below the welding position to prepare for a new pipe section to be arranged above the upper end of the lowered pipeline.

The welding of two pipe sections requires exact positioning of the welding equipment, in particular the welding heads with respect to the weld gutter. In a known welding system, a guiding device is provided which guiding device is configured to revolve welding equipment about the axis of the pipe sections. The guiding device comprises a clamping band which is placed about the pipe section and supports one or more carriers each carrying one or more welding heads. The carriers are movable with respect to the clamping band and configured to revolve the welding heads about the circumference of the pipe section substantially in line with the weld gutter.

An example of the known guiding device is for instance disclosed in WO 2004/071702, the contents of which are herein incorporated by reference. In the guiding device of WO 2004/071702 two separate carriers are provided to revolve two welding heads at different speeds about a pipe section to provide a weld between the two pipe sections.

During placement of the clamping band on the respective pipe sections, the clamping band has to be accurately positioned with respect to the end of the pipe section on which it is mounted so that the task zone of the equipment carried by the clamping band is lined up with the weld gutter. This positioning is carried out by manually adjusting the position of the clamping band to the correct location before definitive clamping of the clamping band. The manual positioning of the clamping band requires a considerable effort and is time-consuming.

After the welding of two pipe sections, the resulting weld has to be inspected. For this inspection a separate welding inspection unit is used. In the known method, the guiding device of the welding heads is removed from the pipe section, and a new guiding device for the inspection equipment is clamped on the pipe section. The guiding device of the inspection equipment comprises a clamping band which supports a movable carrier which may revolve around the pipe to inspect the weld.

Usually, the clamping band of the inspection equipment guiding device has to be placed at a different distance from the weld than the clamping band of the welding heads guiding device, as the working height of the respective equipment is not the same. However, when placing the clamping band of the inspection equipment guiding device the original weld gutter is not exactly known which makes correct placement more difficult. In practice, prior to welding a scribe line is made on the pipe section at a certain distance of the weld gutter to indicate the exact location of this weld gutter. However, it is time consuming to make a scribe line prior to welding and to exchange the welding equipment guiding device for the inspection equipment guiding device after welding.

SUMMARY OF THE INVENTION

It is desirable to provide a guiding device which makes the correct positioning of a working plane of equipment carried by said guiding device with respect to the end of a pipe section on which it is mounted more easily.

Furthermore, it is desirable to provide a guiding device for guiding equipment for welding pipe sections together and/or inspecting or repairing a weld, wherein the chance on human errors and the time needed to prepare, inspect or repair a weld is substantially reduced.

In an embodiment the present invention provides a guiding device configured to guide equipment units for joining pipe sections which are arranged in a substantially upright position, said guiding device comprising:

a stationary body, one or more movable carriers being movably supported on said stationary body and configured to revolve one or more equipment units about a pipe section, a pipeline engagement device configured to engage said guiding device with said pipe section and to support said stationary body, and one or more adjustable supports, said one or more adjustable supports being configured to make adjustment possible of a working plane of one or more equipment units mounted on or to be mounted on said one or more carriers with respect to a pipe section on which the guiding device is mounted.

By providing one or more adjustable supports the positioning of the working plane of one or more equipment units on the guiding device with respect to the pipe section is made easier, since the adjustment may be performed more controlled due to the presence of the adjustable supports. Preferably the guiding device comprises three adjustable supports. However, one adjustable support may also suffice, for instance a 3 D manipulator arm.

In an embodiment the working planes of all equipment units carried or to be carried on the one or more carriers lie in the same plane so that only once after the mounting of the guiding device on a pipe section the one or more adjustable supports have to be adjusted to line up all equipment units. Such common working plane for at least a considerable number of the equipment units is regarded to be the working plane of the guiding device.

The stationary body may be any body, such as a frame or a cylinder-shaped body, which is configured to movably support the one or more movable carriers and on which the pipeline engagement device is mounted. The pipeline engagement device is preferably a clamping device which can be clamped on a pipe section. However, any other pipeline engagement device configured to mount fixedly the guiding device on a pipe section may also be used.

In an embodiment an adjustable support may comprise a screw connection having a first part and a second part with complementary screw threads. By turning the first part with respect to the second part the length of the screw connection can be adjusted and therewith the position of a working plane of the guiding device with respect to the pipe section.

In an embodiment the guiding device comprises a line-up measuring device configured to measure a position of a working plane of said guiding device with respect to the end of the pipe section on which the guiding device is mounted. The line-up device may determine the position of the working plane of the equipment carried on the guiding device with respect to the pipe section. The line-up measuring device may be an optical sensing device, mechanical sensing device or other sensing device, that is moved along the circumference of the pipe section to determine the position of the working plane of the guiding device with respect to the pipe section on which the guiding device is mounted.

Consequently, the information obtained by the line-up measuring device may be used to adjust manually or automatically the position of the working plane of the guiding device with respect to the pipe section so that the working plane is in line with the end of the pipe section and thus with the weld gutter where the weld is to be made.

In an embodiment of the invention, the one or more carriers may carry or be configured to carry all equipment units which are necessary to prepare a weld. These equipment units may include a line-up measuring device, a pre-heating unit, a number of welding heads, an inspection unit and a weld coating unit. The one or more equipment units may also comprise tools which are used to repair a weld such as gouging tools, pipe cutting tools, pipe end beveling tools, and laser equipment. The equipment units have preferably all the same working height, i.e. the task zones of the equipment units are located at the same height with respect to the stationary body of the guiding device. The equipment units may be permanently mounted on the carriers or be easily exchangeable.

In an embodiment of the invention the one or more adjustable supports are provided between the stationary body and the clamping device. In such embodiment the clamping device may be firmly clamped on the pipe section as a first step of the mounting of the guiding device. After measuring the position of the working plane of the equipment mounted on the carriers with respect to the position of the upper end of the respective pipe section, the adjustable supports may be adjusted to bring the working plane in line with the end of the pipe section.

In an embodiment the one or more adjustable supports are mounted on said stationary body and are configured to rest on a collar which is provided at an upper end of a lower pipe section to be welded. In such embodiment the clamping device may be clamped on the pipe section during measuring of the position of the working plane of the guiding device before adjustment of the adjustable supports. However, during the adjustment of the adjustable supports the clamping force should be released to make adjustment and consequent movement of the stationary body with respect to the pipe section possible. After adjustment of the adjustable supports the clamping device may again firmly be clamped on the pipe section to avoid any further movement of the guiding device with respect to the pipe section during the manufacture of the weld.

In an embodiment the one or more adjustable supports may be provided between the stationary frame and each of the one or more carriers. In an embodiment the one or more adjustable supports may also be integrated in the one or more equipment units.

In an embodiment the guiding device comprises actuators for each of said one or more adjustable supports, the actuators being configured to actuate a respective adjustable support. By using actuators to actuate the adjustable supports, the adjustment of the supports may be performed automatically based on the information of a line-up measuring device. However, it is also possible that the control of the actuator is performed manually, and the actuators are only provided to avoid true manual labor during the adjustment of the adjustable supports.

The invention further relates to a method for joining pipe sections in which use is made of the above guiding device.

SHORT DESCRIPTION OF THE DRAWINGS

Further advantages and characteristics of the invention will be elucidated at the hand of a detailed description of two preferred embodiments of a guiding device according to the invention, whereby reference will be made to the following drawings, in which.

DETAILED DESCRIPTION OF PREFERRED EMBODIMENTS

Figure 1:
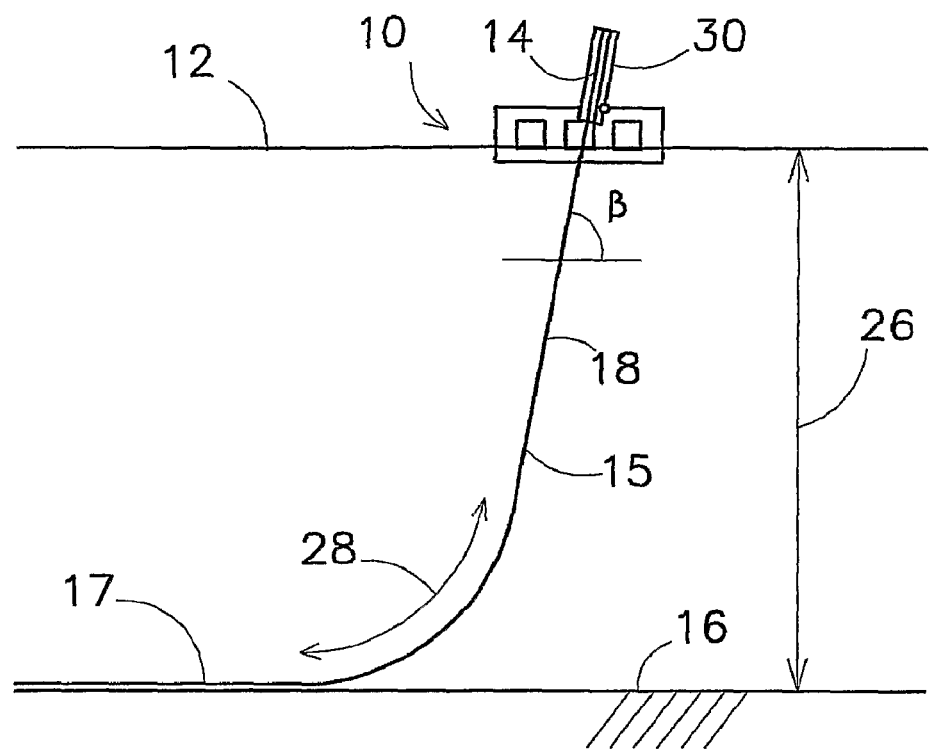
FIG. 1 is a schematic side view of a pipe-laying vessel laying a pipeline.
Figure 2:
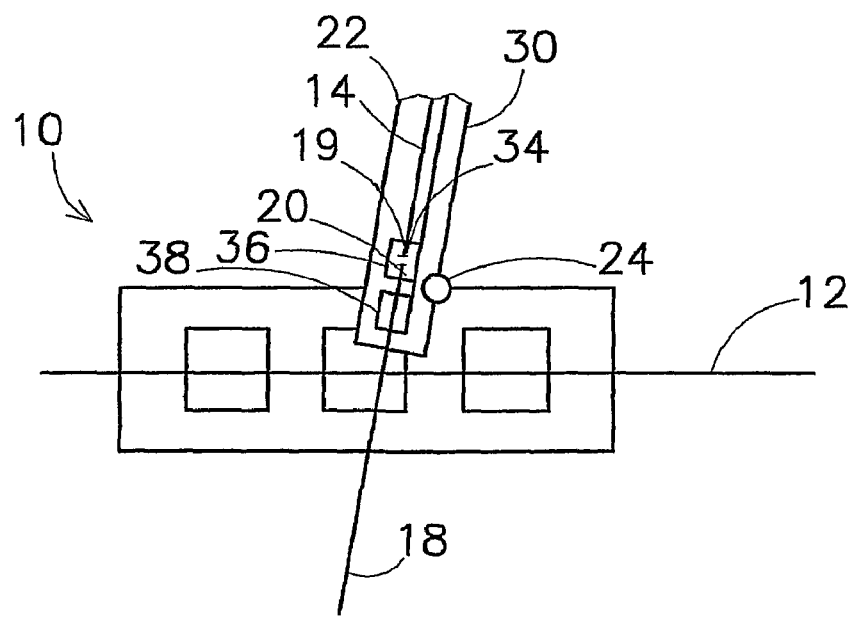
FIG. 2 is a schematic side view of the pipe-laying vessel of FIG. 1.

Referring to FIGS. 1 and 2, a pipe-laying vessel 10 is shown, which floats on a water surface 12. The pipe-laying vessel 10 comprises an inclined J-lay tower 30 which is connected by at least one hinge 24 to the pipe-laying vessel 10. The pipeline 18 is constructed by repeatedly welding pipe sections 14 to a free end 20 of the pipeline 18.

Depending on the water depth 26 and the submerged weight and stiffness of the pipeline 18, the tower 30 is set to an angle β with the horizontal, the angle β varying between 50 and 90 degrees. Pipe sections placed on the tower 30 and thus having an angle β with respect to the horizontal are in the context of the present application regarded to be in a substantially upright position.

During a J-lay operation, the pipeline 18 leaves the pipe-laying vessel 10 and extends in a J-shape between the pipe-laying vessel 10 and a seabed 16. A horizontal force is exerted on the free end 20 of the pipeline 18 by pipe-laying vessel 10 in order to prevent buckling of the pipeline 18 in the curved section 28 of the pipeline 18.

The process of adding a pipe section 14 to the pipeline 18 comprises a number of activities. First, the pipe section 14 is loaded onto the pipe construction ramp 22 which is located in the J-lay tower 30. Next, the lower end 19 of the pipe section 14 is positioned relative to the free end 20 of the pipeline 18 such, that a high quality weld 34 can be made. Subsequently, the weld 34 is made, connecting the pipe section 14 to the pipeline 18. After the laying of the weld 34, the weld 34 is inspected and approved. Finally, the weld is coated.

When a minimum cycle time of the connecting of a single pipe section is to be attained, all the respective activities should preferably be performed in a minimum time span, allowing for a minimum total cycle time of the add-on process.

The present invention provides a guiding device which is used to carry and guide equipment units, such as welding and inspection equipment, during the joining of two pipe sections. With the guiding device of the present invention the cycle time of the connecting of a single pipe section can substantially be decreased.

Figure 3:
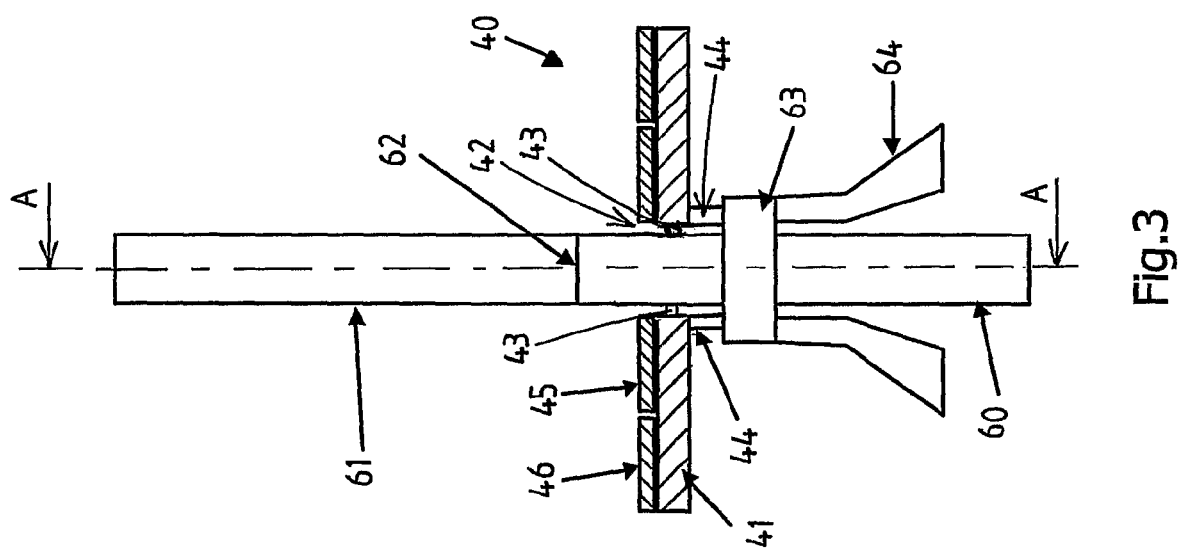
FIG. 3 shows a side view of a first embodiment of a guiding device according to the invention.

FIG. 3 shows a first embodiment of a guiding device according to the invention, in general indicated with the reference numeral 40. In FIG. 3, the guiding device 40 is mounted on a lower pipe section 60 which lower pipe section 60 is aligned with an upper pipe section 61. Between the upper end of the lower pipe section 60 and the lower end of the upper pipe section 61, a weld gutter 62 is formed by the shapes of the respective upper and lower pipe ends. This weld gutter may for instance be a so-called narrow gap weld gutter, but also any other suitable type of weld gutter. The guiding device 40 is provided to carry and guide equipment around the pipe sections 60 and 61 to provide a correct weld at the location of the weld gutter 62.

The lower pipe section 60 comprises a collar 63 which is supported by a pipeline support structure 64. The use of a collar 63 to facilitate the support of a pipeline is known in the art.

The guiding device 40 comprises a stationary body in the form of a frame 41. The frame 41 is clamped on the lower pipe section by a clamping device 42. The clamping device 42 comprises four clamping arms 43. The clamping arms 43 are arranged at angles of 90 degrees about the circumference of the frame 43 so that by pressing the clamping arms 43 against the pipe section 60 a firm connection between the guiding device 40 and the pipe section 60 may be obtained. In the embodiment shown in FIG. 3, two clamping arms 43 are static, i.e. the clamping arms do not actively exert a clamping force on the pipe section. The static clamping arms may be manually adjustable for the diameter of the pipe sections. Two clamping arms 42 are hydraulic arms with which the actual clamping force is exerted on the pipe section.

In alternative embodiments any suitable combination of static and hydraulic arms, or any other active clamping means, such as pneumatic or mechanical clamping means may be used. For instance, the clamping device 42 may comprise three hydraulic or pneumatic clamping arms which are arranged at angles of 120 degrees about the circumference of the pipe section.

In the embodiment shown in FIG. 3, the clamping arms exert the clamping force directly on the pipe section 60. In an alternative embodiment the clamping arms may also be arranged to exert the clamping force on the outside surface of the collar 63 as the collar 63 provides a suitable clamping surface.

Furthermore, the frame 41 is supported by a number of adjustable supports 44 on the collar 63 of the lower pipe section 60. These adjustable supports can be adjusted to change the distance between the frame and the bottom of each of the supports so that the working plane of equipment units which are arranged on the guiding device 40 can be brought in line with the upper end of the lower pipe section 60.

It will be clear that the adjustable supports 44 can only be adjusted when the clamping device 42 does not firmly clamp the guiding device 40 on the first pipe section 60. Thus, to make any adjustment of the position of the frame with respect to the lower pipe section, the clamping force of the clamping device 42 should at least be reduced to an extent that upon adjustment of the adjustable supports 44 sliding of the clamping arms 43 on the lower pipe section 60 is possible.

The adjustable support 44 may be adjustable by the provision of a manually operated or motorized screw connection between two parts of the adjustable support 44 so that by rotating the parts with respect to each other the length of the adjustable support can be altered. In alternative embodiments the adjustable supports 44 may be a vertically placed pneumatic or hydraulic pistons of which the height can be adjusted, or any other means of which the length parallel to the axis of the pipeline can be adjusted.

The adjustable supports of the embodiment of FIG. 3 are automatically adjustable by controlling an actuator which is configured to actuate the adjustable support to a desired position. the actuators may for instance be electric, pneumatic or hydraulic motors. The desired position of the adjustable supports 44 may be controlled by an operator or may be controlled automatically based on the results of a line-up measurement in which the position of a working plane with respect to the pipe section 60 on which the guiding device 40 is mounted is determined. In alternative embodiments the adjustable supports may be adjusted manually.

The guiding device 40 comprises two concentric carrier sheaves 45 and 46 configured to carry a number of equipment units which are used for joining an upper end of the lower pipe section 60 and a lower end of the upper pipe section 61. The carrier sheaves 45 and 46 are rotatable about an axis A-A which axis substantially corresponds with the axis of the lower and upper pipe sections 60 and 61 so that equipment which is carried on the sheaves 45, 46 will be guided along the circumference of the pipe sections 60 and 61 upon rotation of the sheaves 45, 46.

In alternative embodiments of the guiding device 40, one or three or more carrier sheaves may be provided. In the present embodiment two carrier sheaves 45, 46 are provided to make it possible that different equipment units, for instance two welding heads, are guided about the pipe sections 60, 61 at different speeds. If such difference in speed of different equipment units at the same time is not required, only one carrier sheave may suffice.

Also in alternative embodiments, the carrier sheaves 45, 46 may be replaced by any other carrier which is capable to revolve one or more equipment units about the circumference of the pipe section 60, 61 to perform activities relating to the joining of the pipe sections. For instance, the frame 41 may be provided with a circular rail which runs around and is concentric with the pipe sections and on which one or more carriers can be moved to guide equipment units around the pipe sections 60, 61.

In the embodiment of FIG. 3 the frame 41 and the sheaves 45, 46 encircle the pipe sections 60 and 61. In practice, a section may be provided in the pipeline of which the diameter is larger than the inner diameter of the inner sheave 45. To make the passing of such larger part through the guiding device possible, the frame 41 and sheaves 45, 46 are preferably subdivided in two parts which may be hingeably connected to each other. When needed, the two parts can be taken apart to enlarge the opening in the guiding device. It may also be possible to completely remove the guiding device from the pipeline to make the passing of very large pipeline parts possible.

Figure 4:
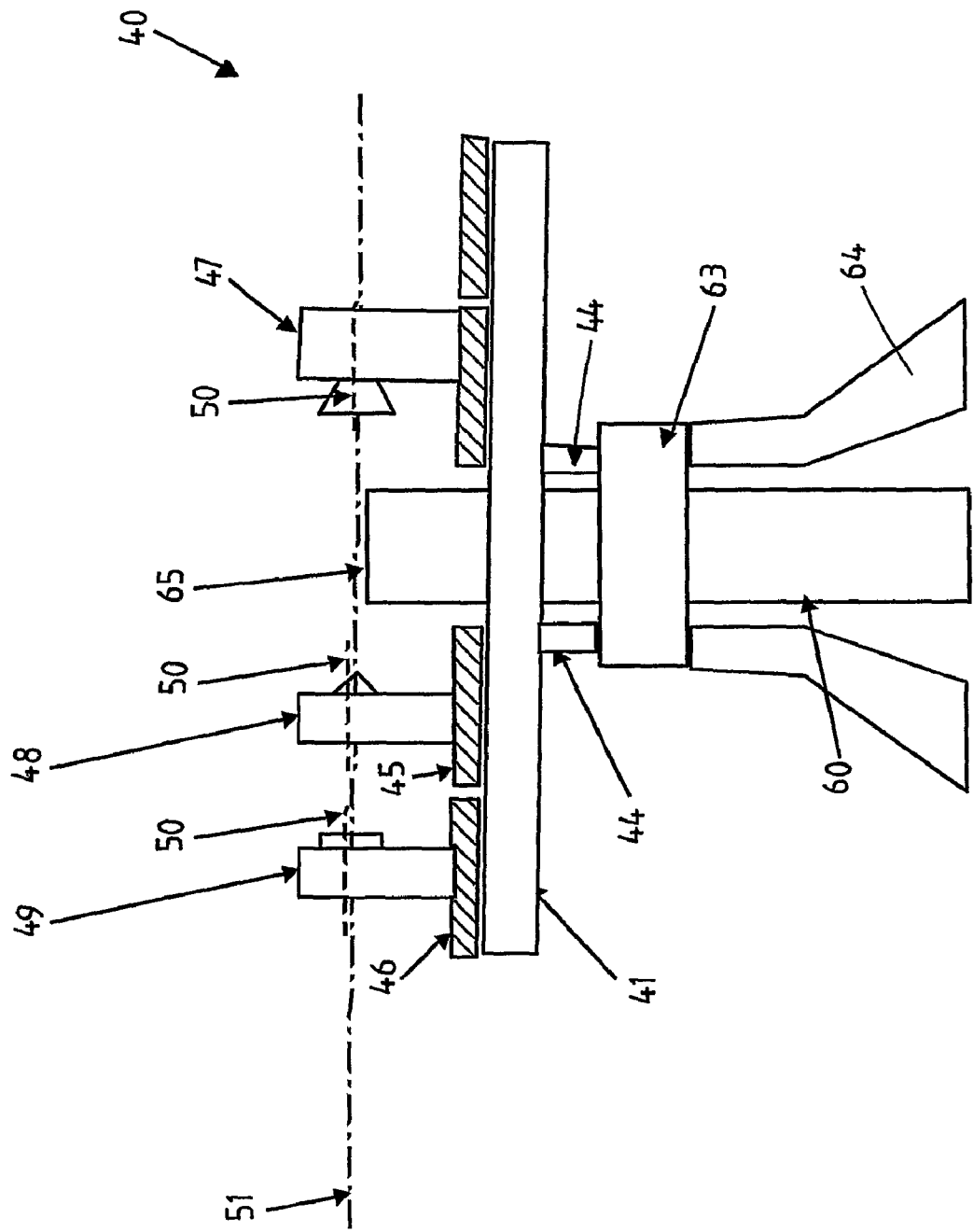
FIG. 4 shows the guiding device of FIG. 3 after pre-clamping of the device on a pipe section.

FIG. 4 shows the guiding device 40 of FIG. 3 just after being pre-positioned on the lower pipe section 60, i.e. before lining up of said guiding device 40 with the upper end 65 of the lower pipe section 60. The sheave 45 carries a first equipment unit, for instance a line-up measuring device 47, and a second equipment unit, for instance a first welding head 48. The second sheave 46 carries a third equipment unit 49, for instance a second welding head.

Further equipment units may be provided on the sheaves 45, 46. These equipment units may comprise preheating equipment, weld inspection equipment, weld coating units or any other equipment which may be used for the preparation of the weld between the lower and the upper pipe section 60 and 61. The equipment units may also comprise equipment for the repair of a weld, such as gouging tools, pipe cutting tools and pipe end beveling tools.

The equipment units may be continuously placed on the carrier sheaves 45, 46, or the equipment units may be placed on the carrier sheave when a particular task has to be performed and thereafter be removed to make place for another equipment unit.

Each equipment unit 47, 48 and 49 comprises a task zone 50 which is the area in which the equipment units can carry out their respective tasks. This task zone 50 is located at a certain working height with respect to the frame.

Advantageously, the task zones 50 of the equipment units 47, 48 and 49 are arranged substantially in the same working plane 51, i.e. the working height of all equipment units 47, 48 and 49 is substantially the same. As a result, the working plane 51 only has to be aligned one time with the upper end 65 of the lower pipe section 60, where after all tasks which may be carried out with the different equipment units carried by the guiding device 40 may be executed without the requirement of re-adjustment of the height of the working plane 51 between the different tasks.

It is remarked that it is possible that the task zones 51 of equipment units 47, 48 and 49 may also be located at different heights within the range of the adjustable supports 44 so that between the different tasks the task zone of the following equipment unit to be used can be brought to the desired working level. As the working height of the different task zones 50 is known, no separate measurement of the frame with respect to the pipe section 60 has to be made. After each task is finished, the guiding device can be adjusted to bring the next equipment unit at the level of the weld gutter or weld.

The line-up measuring unit 47 is capable of determining the position of the upper end 65 of the pipe section 60 with respect to the frame 41 and thus the working plane 51 of the guiding device 40. By revolving the line-up measuring unit 47 about the circumference of the pipe section 60, the position of the circumference of the upper end 65 of the pipe section may be determined. On basis of the information obtained by the line-up measuring device, the adjustable supports may be manually or automatically adjusted to align the working plane 51 of the guiding device 40 with the upper end 65 of the pipe section 60.

The line-up measuring unit 47 may for instance be an optical sensing device comprising one or more cameras or a laser sensor, a mechanical sensing device comprising a mechanical feeler, a magnetic proximity switch or any other device capable of measuring the position of the working plane 51 with respect to the upper end 65.

The adjustable supports 44 make an easy and accurate adjustment possible of the working plane 51 of the guiding device 40 with respect to the upper end 65 of the pipe section 60. The alignment may involve an adjustment of both the axial distance and any inclination difference between the working plane 51 and the upper end 65.

Figure 5:
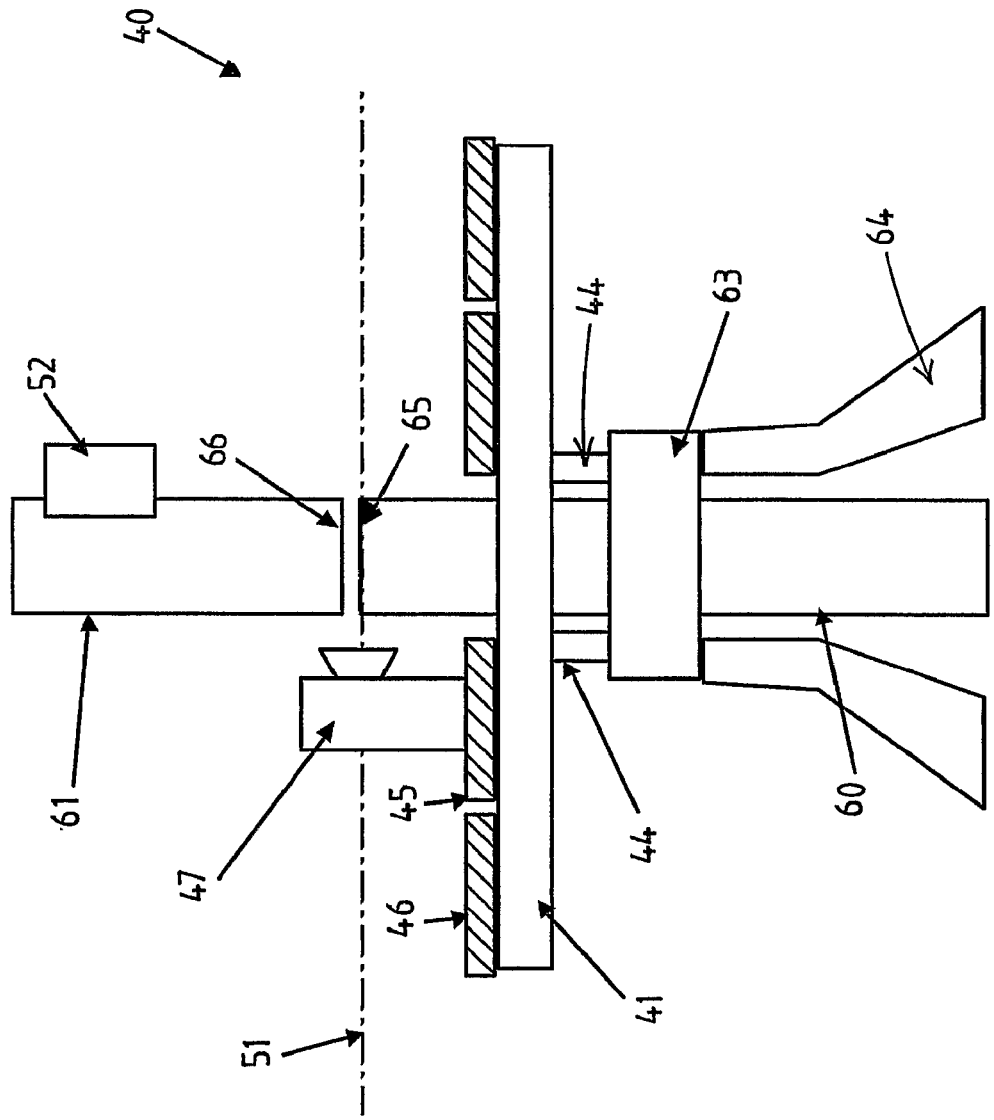
FIG. 5 shows the guiding device of FIG. 3 after lining up of the working plane of the guiding device with the upper end of a lower pipe section.

In FIG. 5, the guiding device 40 is shown after adjustment of the adjustable supports 44. The working plane 51 of the guiding device 40 substantially corresponds with the plane of the upper end 65 of the pipe section 60. In the meantime an upper pipe section 61 has been arranged on the laying tower. The lower end 66 of the upper pipe section has been brought in the vicinity of the upper end 65 of the lower pipe section 60. The upper end 66 and the lower end 65 have to be accurately placed on top of each other to create a weld gutter in which successfully a weld can be made.

In the embodiment shown in FIG. 5, the line-up measuring unit 47 which was used to determine the position of the working plane 51 with respect to the pipe section 60 may also be used for determination of the alignment of the upper pipe section 61 with respect to the lower pipe section 60. Thus, the line-up measuring device 47 is capable of determining both the position of the upper end 65 and the position of the lower end 66. This information is used to actuate a line-up device 52 which can accurately move the pipe section 61 to align the two pipe sections 60 and 61. This movement may involve both axial and lateral displacements as well as rotations about axes perpendicular to the axis of the pipe.

In an alternative embodiment it is also possible that a second line-up measuring unit is provided for the alignment of the two pipe sections 60 and 61 with respect to each other, while the first line-up measuring unit is used for the determination of the position of the working plane 51 with respect to the pipe section 60.

After correct placement of the lower end 66 of the upper pipe section 61 with respect to the upper end 65 of the lower pipe section 60, the next equipment unit can be revolved one or more rounds around the pipe sections 60, 61 to make a next step in the preparation of the weld between the pipe sections 60, 61. These other equipment units are however not shown in FIG. 5.

Figure 6:
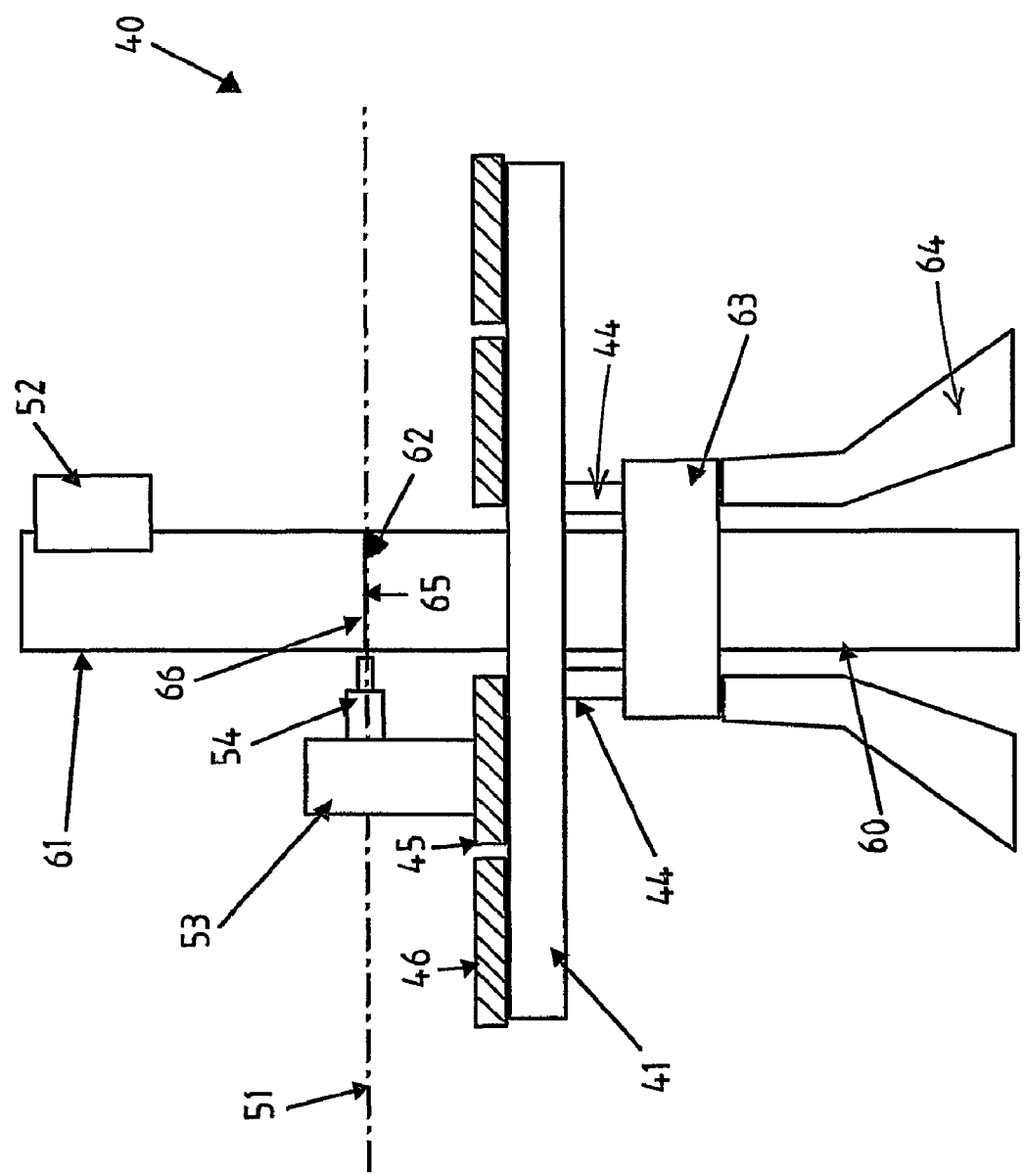
FIG. 6 shows the guiding device of FIG. 3 during welding of the two pipe sections.

In FIG. 6 the guiding device 40 is shown during the welding phase of the manufacture of the weld. A welding head 53 which is placed on the carrier sheave 45 is revolved about the pipe sections to provide a weld in the weld gutter 62 to join the pipe sections 60 and 61 together. The torch 54 of the welding head 53 which is positioned in the working plane 51 of the guiding device 40 is correctly lined up with the weld gutter 62.

Before and after the welding phase further tasks can be performed for the manufacture of the weld such as pre-heating, weld inspection, and coating of the weld. For each of these tasks different equipment units may be carried by one of the carrier sheaves 45 and 46. However, as for all these equipment units the task zones 50 are located in substantially the same working plane 51, the position of the guiding device 40 does not have to be changed or checked before performing a subsequent task. In this way, the cycle time for the preparation of a weld and the risks on human errors are substantially reduced.

Figure 7:
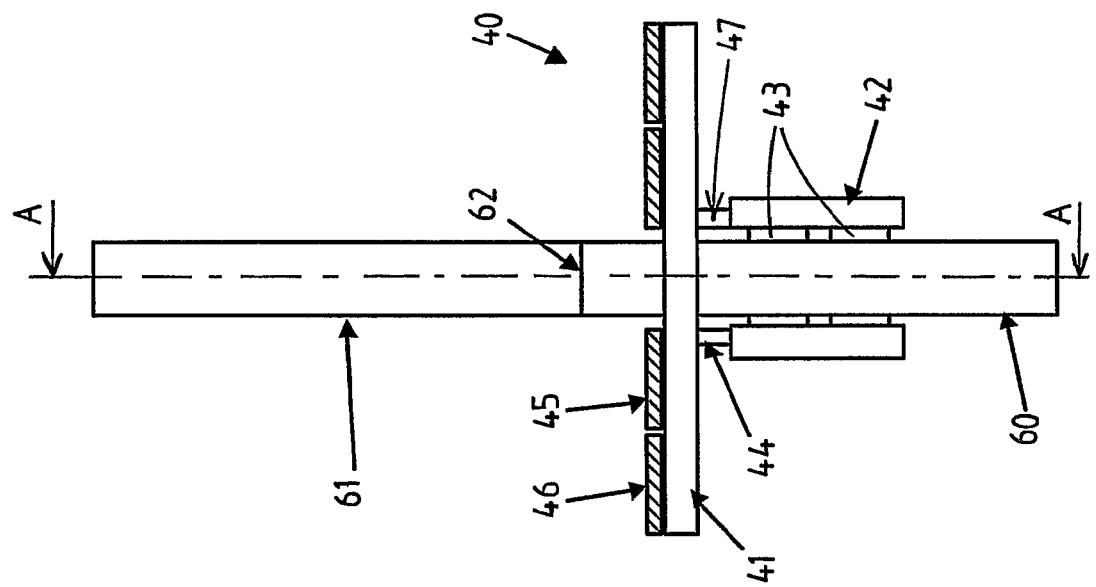
FIG. 7 shows an alternative embodiment of the guiding device according to the present invention.

FIG. 7 shows another embodiment of a guiding device 40 according to the invention. In the drawing corresponding parts of the guiding device are indicated with the same reference numerals as used in FIGS. 3-6. The guiding device 40 comprises a frame 41, a clamping device 42 having clamping arms 43, adjustable supports 44 and two sheaves 45 and 46 which are independently rotatably supported by the frame 41.

The adjustable supports 44 are arranged between the clamping device 42 and the frame 41. As a result, the clamping device 42 may be firmly clamped on the pipe section 60 during pre-positioning. The clamping force does not have to be removed when adjusting the height of the working plane 51 with respect to the pipe section 60 as the clamping device is used both for clamping the guiding device to the pipe section 60 and for supporting the adjustable supports 44.

In an alternative embodiment the adjustable supports 44 may also be provided in the frame 41 or between the frame 41 and each of the carrier sheaves 45, 46 or any other carrier.

In the above description equipment units were carried by the rotatable sheaves 45 and 46. These equipment units may comprise all or only a portion of the parts required to perform a certain task of the manufacture of a weld. In every case, the part of the equipment which has to interact the with pipe section itself is placed on the carrier sheave. For instance, for the provision of the actual weld, only the welding head 53 may be arranged on the sheave 45 while the further welding equipment is arranged on another stationary or rotatable platform.

In the above embodiments the guiding device according to the invention is mounted on the lower pipe section 60. In an alternative embodiment it is also possible to mount the guiding device on the upper pipe section 61. In such embodiment the equipment units may be hung at the frame so that the respective equipment units are rotated about the pipe sections at the underside of the frame.

However, it is preferable to mount the guiding device on the lower pipe section 60 for one or more of the following reasons. The guiding device may already be mounted on the lower pipe section before the lower pipe section is arranged on the J-lay tower. The guiding device, in particular a line-up measuring device carried by said guiding device may be used for the lining up of the upper pipe section with respect to the lower section. And, the collar on the lower pipe section, if present, may provide an efficient support for the adjustable supports of the guiding device.

In this application the term guiding device is used for a device which is capable of revolving one or more equipment units at a certain working plane about a pipe section in order to perform activities relating to the welding, inspection and/or repair of a weld between two pipe sections.

The invention claimed is:

1. A guiding device configured to guide equipment units for joining pipe sections and/or for inspecting and/or repairing a weld between pipe sections which are arranged in a substantially upright position, said guiding device comprising:
    a stationary body,
    one or more movable carriers being movably supported on said stationary body and configured to revolve one or more equipment units about a pipe section,
    a pipeline engagement device configured to engage said guiding device with said pipe section and to support said stationary body, and
    one or more adjustable supports, said one or more adjustable supports being configured to adjust a position of said stationary body with respect to said pipe section in order to make adjustment possible of a working plane of one or more equipment units mounted on or to be mounted on said one or more carriers with respect to a pipe section on which the guiding device is mounted.

2. The guiding device of claim 1, wherein said guiding device further comprises a line-up measuring device configured to measure a position of a working plane of said guiding device with respect to the end of the pipe section on which the guiding device is mounted.

3. The guiding device of claim 2, wherein said line-up measuring device is mounted on one of said one or more carriers.

4. The guiding device of claim 1, wherein said one or more adjustable supports are provided between said stationary body and said pipeline engagement device.

5. The guiding device of claim 1, wherein said two or more adjustable supports are mounted on said stationary body and are configured to rest on a collar which is provided at an upper end of a lower pipe section to be welded.

6. The guiding device of claim 1, wherein said guiding device comprises actuators for each of said two or more adjustable supports, configured to actuate a respective adjustable support.

7. The guiding device of claim 3 and claim 6, wherein said actuators are configured to automatically adjust said respective adjustable support on the basis of a measurement of said line-up measuring device.

8. The guiding device of claim 1, wherein said guiding device comprises two or more adjustable supports, preferably three adjustable supports.

9. The guiding device of claim 1, wherein said one or more equipment units comprise at least one or more welding heads and a weld inspection unit.

10. The guiding device of claim 1, wherein said one or more movable carriers comprise a rotatable ring-shaped carrier which is concentrically arranged about said pipe section.

11. The guiding device of claim 1, wherein said guiding device comprises a first and a second movable carrier.

12. The guiding device of claim 1, wherein said pipeline engagement device is a clamping device configured to be clamped on a pipe section.

13. The guiding device of claim 1, wherein all working planes of the one or more equipment units carried on or to be carried on said one or more carriers lie in substantially the same plane.

14. A method for joining pipe sections and/or inspecting and/or repairing a weld between pipe sections, which are arranged in a substantially upright position, using the guiding device of claim 1, the method comprising the steps:
    engaging the guiding device with a pipe section by using the pipeline engaging device,
    measuring the position of a working plane of at least one of said one or more equipment units with the end of the pipe section,
    adjusting said one or more adjustable supports of said guiding device to line up said working plane with said end of said pipe section, and
    revolving said at least one of said one or more equipment units about said pipe section.

15. The method of claim 14, wherein said measuring is carried out by a line-up measuring device which is supported on said one or more carriers.

16. The method of claim 14, wherein said adjusting is performed manually.

17. The method of claim 14, wherein said adjusting is performed automatically by actuators configured to actuate said two or more adjustable supports.

18. The method of claim 14, wherein said one or more adjustable supports directly support on a collar of said pipe section, the pipeline engagement device being configured to temporarily release the engagement after the measuring step to make adjustment of the position of said guiding device with respect to the pipe section possible.

19. The method of claim 14, wherein said pipe section is a lower pipe section.

20. The method of claim 14, wherein said line-up measuring device also is used for lining up an upper pipe section with respect to a lower pipe section.

21. The method of claim 14, wherein said joining of said pipes sections comprises:
  providing a weld between an upper end of a lower pipe section and a lower end of an upper pipe section, and inspecting the weld,
  the equipment for welding and the equipment inspection being at least partially carried by said one or more movable carriers.

22. The method of claim 14, wherein said measuring step and adjusting step are repeated for at least another of said one or more equipment units which is consequently revolved about said pipe section.

* * * * *